(12) United States Patent
Sahyoun (10) Patent No.: US 7,859,144 B1
(45) Date of Patent: Dec. 28, 2010

(54) LOW FREQUENCY ELECTROMAGNETIC MOTOR TO CREATE OR CANCEL A LOW FREQUENCY VIBRATION

(76) Inventor: Joseph Y Sahyoun, 3031 Hopkins Ave., Redwood City, CA (US) 94062

( * ) Notice: Subject to any disclaimer, the term of this patent is extended or adjusted under 35 U.S.C. 154(b) by 714 days.

(21) Appl. No.: 11/513,743

(22) Filed: Aug. 31, 2006

(51) Int. Cl.
*H02K 33/12* (2006.01)
*H02K 33/18* (2006.01)

(52) U.S. Cl. .............................. 310/15; 310/14; 310/17; 335/229; 335/234

(58) Field of Classification Search .................. 310/14, 310/15, 17; 335/229, 234
See application file for complete search history.

(56) References Cited

U.S. PATENT DOCUMENTS

| | | | | |
|---|---|---|---|---|
| 2,108,775 A | * | 2/1938 | Macgeorge | 361/209 |
| 2,167,078 A | | 7/1939 | Lakatos | |
| 3,024,374 A | | 3/1962 | Stauder | |
| 3,070,730 A | * | 12/1962 | Gray et al. | 335/229 |
| 3,105,153 A | | 9/1963 | James, Jr. | |
| 3,119,940 A | * | 1/1964 | Pettit et al. | 310/24 |
| 3,129,347 A | | 4/1964 | Tognola | |
| 3,582,875 A | | 6/1971 | Van Wambeck et al. | |
| 3,728,654 A | | 4/1973 | Tada | |
| 3,859,547 A | * | 1/1975 | Massie | 310/14 |
| 3,891,874 A | * | 6/1975 | Roters et al. | 310/14 |
| 3,980,908 A | * | 9/1976 | McClintock | 396/465 |
| 4,253,493 A | * | 3/1981 | English | 137/625.18 |
| 4,381,181 A | | 4/1983 | Clegg | |
| 4,439,700 A | * | 3/1984 | Menzel et al. | 310/13 |
| 4,542,311 A | | 9/1985 | Newman et al. | |
| 4,682,135 A | * | 7/1987 | Yamakawa | 335/256 |
| 5,017,819 A | * | 5/1991 | Patt et al. | 310/90.5 |
| 5,166,652 A | * | 11/1992 | Koyama et al. | 335/234 |
| 5,187,398 A | | 2/1993 | Stuart et al. | |
| 5,231,336 A | | 7/1993 | van Namen | |
| 5,335,284 A | | 8/1994 | Lemons | |
| 5,365,210 A | * | 11/1994 | Hines | 335/238 |
| 5,424,592 A | | 6/1995 | Bluen et al. | |
| 5,896,076 A | * | 4/1999 | van Namen | 335/229 |
| 5,973,422 A | | 10/1999 | Clamme | 310/36 |
| 6,169,811 B1 | | 1/2001 | Croft, III | 381/186 |
| 6,201,329 B1 | | 3/2001 | Chen | |
| 6,225,713 B1 | * | 5/2001 | Hattori et al. | 310/15 |
| 6,326,706 B1 | | 12/2001 | Zhang | |
| 6,894,408 B2 | * | 5/2005 | Godkin | 310/13 |
| 7,157,815 B2 | * | 1/2007 | Cordiale et al. | 310/24 |
| 7,259,832 B2 | * | 8/2007 | Dams | 355/72 |
| 7,449,803 B2 | | 11/2008 | Sayhoun | |

(Continued)

*Primary Examiner*—Burton Mullins
(74) *Attorney, Agent, or Firm*—Allston L. Jones; Peters Verny, LLP (57) ABSTRACT

Electromagnetic motor with a piston that moves linearly with respect to the stator in either direction. Embodiments include a piston internal or external the stator. The piston includes one or more magnetic flux producing elements in all embodiments, with some embodiments having a ferro-magnetic plate on either side of the flux producing element. Further, in all embodiments the stator includes three magnetic flux producing elements with either two coils with one or more magnets therebetween or with the two coils and a coil magnet substitute therebetween. All embodiments provide positive piston return to a center at rest position. In all embodiments the piston is centered with respect to the stator resulting from either magnetic interaction between the piston and stator magnets, or between the piston magnet and the stator magnet substitute coil.

19 Claims, 11 Drawing Sheets

U.S. PATENT DOCUMENTS 7,474,018 B2 * 1/2009 Shimizu et al. .......... 310/12.22
7,768,160 B1 * 8/2010 Sahyoun ...................... 310/14
2005/0171458 A1 8/2005 Luden et al. .................. 601/49

* cited by examiner

LOW FREQUENCY ELECTROMAGNETIC MOTOR TO CREATE OR CANCEL A LOW FREQUENCY VIBRATION

CROSS-REFERENCE

This application is related to an application by the same applicant having Ser. No. 11/086,216 filed Mar. 21, 2005 for Electromagnetic Motor to Create a Desired Low Frequency Vibration or to Cancel an Undesired Low Frequency Vibration.

BACKGROUND OF THE INVENTION

1. Field of the Invention

The present invention relates to a linear stroke electromagnetic motor having a movable internal mass that is caused to move selectively by the application of electrical signals to external coils to create an electromagnetic force on the movable internal mass to produce a desired low frequency sound or strong variable vibration or to drive a solenoid like apparatus proportionally to the applied signals.

2. Description of the Prior Art

The prior art includes various linear stroke electromagnetic motors. An early such device is disclosed in U.S. Pat. No. 4,542,311 (hereinafter '311), issued Sep. 17, 1985 and entitled LONG LINEAR STROKE RECIPROCATING ELECTRIC MACHINE. This device includes a cylindrical air gap defined between outer and inner gaps defining surfaces, at least one of which has a length equal to the length of an electric coil plus the length of the stroke. Additionally it includes a flux focusing ring, having a length in the direction of movement equal to the length of the coil in the same direction that concentrates substantially all the field flux and all of the electric coil turns to interact over the entire stroke.

Another device is disclosed in U.S. Pat. No. 5,231,336 (hereinafter '336), issued Jul. 27, 1993 and entitled ACTUATOR FOR ACTIVE VIBRATION CONTROL. Disclosed here is a device that may have either a moving coil or a moving magnet with the moving element undergoing reciprocal motion in response to an electrical input signal. The device described in patent '336 employs a centering shaft that extends through the center of the actuator to radially center the moving element. Additionally, the longitudinal return force on the moving element depends on mechanical springs that are located around each end of the centering shaft. The use of springs in this design, requires frequent service as the spring constant tends to change with time. Additionally, as the moving element moves the springs tend to make noise that is audible when the actuator is in use making application of this device unacceptable in an audio system as a low frequency radiator. Also, if the actuator is mounted vertically with the centering shaft oriented vertically, the weight of the moving element will exercise an uneven load on the springs. The weight of the moving element thus will cause the moving element to partially compress the lower spring and cause the moving element to assume a position that is lower than the desired centered position when at rest which causes the magnet and the actuation coil (voice coil in audio applications) to be offset one from the other. This misalignment will create heat, reduction of performance and possibly destruction of the actuator.

Another representative prior art publication is U.S. Pat. No. 5,424,592 (hereinafter '592), issued Jun. 13, 1995 and entitled ELECTROMAGNETIC TRANSDUCER. Disclosed here is an electromagnetic actuator that includes a first assembly, a second assembly disposed for relative movement with respect to the first assembly and at least a first flexure interconnecting the first assembly and the second assembly. The first assembly includes a core having a first magnetic pole of a first polarity and a second magnetic pole of a second polarity. The second assembly includes a conductive electric coil having a first coil portion and a second coil portion. The first magnetic pole is in a facing relationship with the first coil portion and the second magnetic pole is in a facing relationship with the second coil portion. The first coil portion and the second coil portion are arranged so an electrical current in the coil develops additive flux current products at each of the first coil portion and the second coil portion. Further one of the first assembly and the second assembly includes a magnetic flux return path between the first coil and the second coil portion. The "flexure" in this design in simple terms is a spring and thus this design has problems that are similar to those described above with respect to patent '336.

A fourth representative prior art publication is U.S. Pat. No. 5,973,422 (hereinafter '422), issued Oct. 26, 1999 and entitled LOW FREQUENCY VIBRATOR. The device disclosed here has a stator member with a cylindrical, central chamber, a cylindrical tubular liner of low friction, non-ferromagnetic material positioned in the chamber to form a bearing and a cylindrical, ferromagnetic, reciprocating piston slidably mounted in the liner. The stator has a pair of coils and a permanent magnet is positioned centrally in the reciprocating piston. A ferromagnetic flux conductor surrounds the coils and extends between opposite ends of the chamber. This configuration creates a magnetic spring having a spring constant K with the ratio of K to the mass M of the reciprocating member, made substantially equal to the square of a radian frequency in the operating frequency range of the vibrator.

The preferred design disclosed by patent '422 depends on a metal or ferrite material being installed on the stator to center the slider. The metal on the stator and the magnet of the moving slider have the strongest force at rest. During operation, signals of lower force amplitude than the force that holds the slider in its stationary position are ignored. For example, if the ferrite and the magnet are held in position by a 10 lbs. force, signals that produce force amplitudes of 1 lbs. and up to 9.99 lbs. will tend to be ignored. An 11 lbs. force will lead to an acceleration that is not proportional to the input signal. These render this design a mere solenoid with an output of ON or OFF. Once again this design does not address centering during vertical mounting as gravity will offset the center slider causing it to have very poor performance, heat up and then malfunction.

These and other previous designs each include drawbacks to various applications of the device disclosed. Some require centering rods, and springs to bring the slider back to its neutral position. These complex designs produce spring noise, spring fatigue and require a complex assembly. Other designs to help center the slider included a ferrous ring fastened on the outside of the stator in between the two coils wherein the widths of the ferrous ring and the slider magnet have to be equal for precise centering. That design suffers from short strokes since the excursion of the slider is directly related to the distance between the coils. Another weakness of prior art designs is that they do not offer linear resistance to the slider throughout the path of movement, i.e., the further the slider travels from the center position, the less resistance there is in the direction of movement. These designs only help centering of the slider when in the non-actuated position with the vibration that they produce being non linear and devices designed in these ways simply providing little more than on-off type compliance.

The desired design is one that produces linear excursion as the piston floats freely throughout its travel between the two maximum ends of that travel and has fewer limitations produced by the centering technique employed when the piston is in the non-activated position whether the electromagnetic motor is mounted horizontally, vertically, or at any other angle. The present invention provides such advantages.

SUMMARY OF THE INVENTION

Electromagnetic motor with a piston that moves linearly with respect to the stator in either direction. Embodiments include a piston internal or external the stator. The piston includes one or more magnetic flux producing elements in all embodiments, with some embodiments having a ferro-magnetic plate on either side of the flux producing element. Further, in all embodiments the stator includes three magnetic flux producing elements with either two coils with one or more magnets therebetween or with the two coils and a coil magnet substitute therebetween. All embodiments provide positive piston return to a center at rest position. In all embodiments the piston is centered with respect to the stator resulting from either magnetic interaction between the piston and stator magnets, or between the piston magnet and the stator magnet substitute coil.

BRIEF DESCRIPTION OF THE FIGURES

In each of these figures and the discussions of same, the same component has the same name and reference number.

DETAILED DESCRIPTION OF THE PRESENT INVENTION

The present invention is a low frequency oscillating transducer that is capable of producing low frequency sounds and strong vibrations that has several potential applications. One is as a low frequency transducer that extends the frequency response of a loudspeaker below the audible range without producing other mechanical sounds when in use. Other applications of the low frequency transducer is a vibration actuator: e.g., to interactively shake a theater seat, in synchronization with a movie or stage performance to increase the special effects or surprise to increase the viewer's illusion of being included in the action being viewed; to interactively vibrate a video game controller or chair or floor mat in synchronization with a video game during play to deliver a tactile response to the player; etc. There are also many applications for the present invention as a vibration cancelling device in situations where vibration is undesirable. To cancel the undesirable vibration the electromagnetic motor of the present invention is oriented with the axis of movement of the piston parallel to the axis of the vibration to be cancelled, then a selected signal of a variable pattern and variable strength is applied to the electromagnetic motor that produces an opposing vibration of the same pattern and of equal strength in the opposite direction to that of the undesirable vibration to effectively cancel the undesirable vibration to provide stability for a machine or other device.

The various embodiments of the present invention provide a completely balanced magnetic circuit that produces strong linear piston movement without any byproducts of axial vibration. In the present embodiments the moving mass has a centered home position with the centering produced by linear and balanced magnetic forces when a minimum or zero activating signal is applied to the magnetic motor.

The embodiments of this invention include two main sub-systems that function in cooperation with each other: a stationary sub-system that is referred to herein as the "stator", and a moving sub-system that is referred to herein as the "piston".

Figure 1:
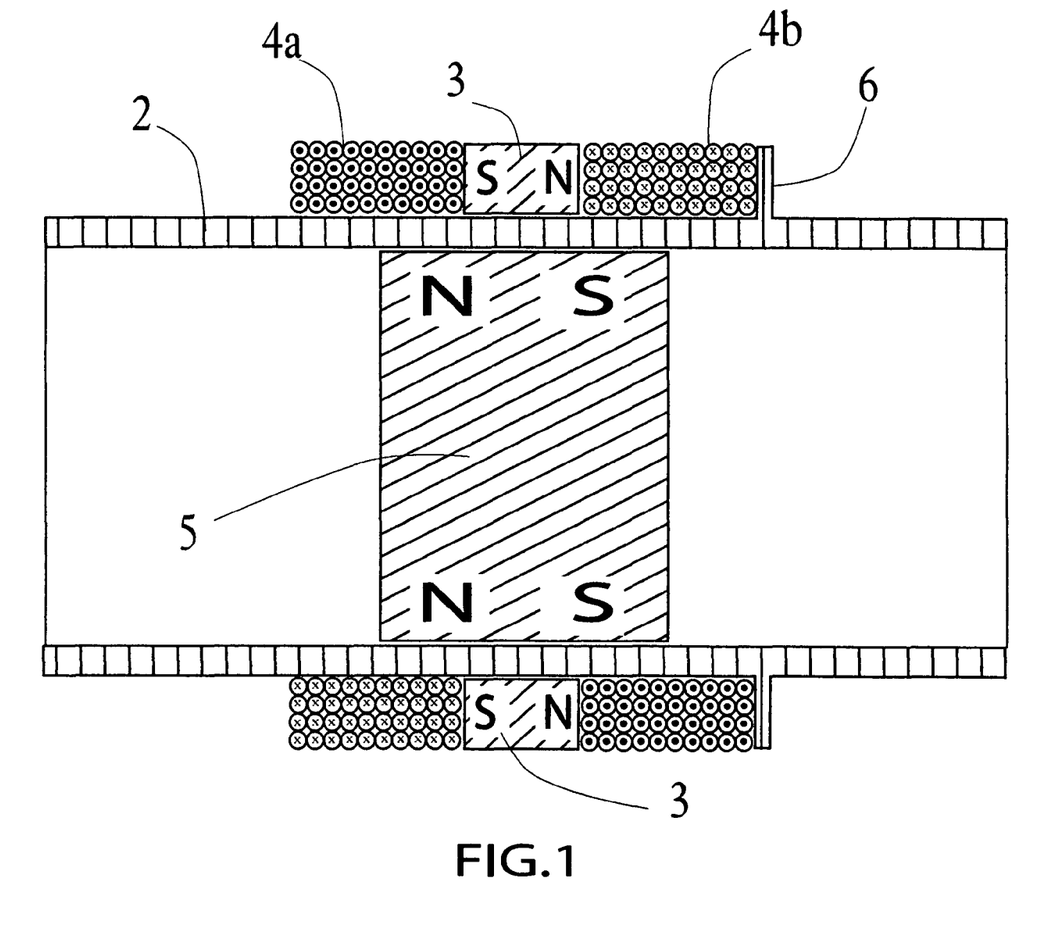
FIG. 1 is a longitudinal cross-section of a first embodiment of the present invention with the piston centered at the at rest position with stator windings unpowered.
Figure 2:
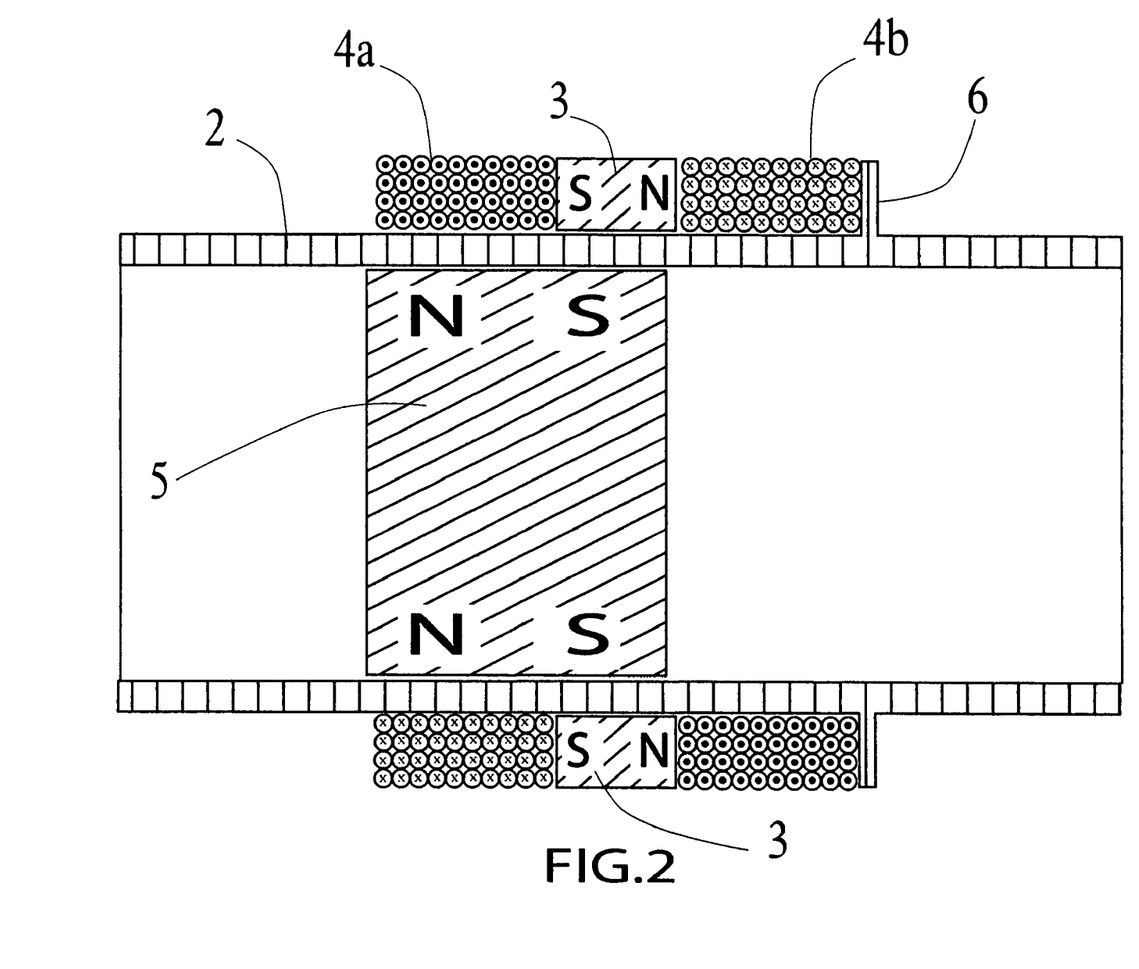
FIG. 2 is a longitudinal cross-section of the first embodiment of FIG. 1 with the piston at the furthest travel point to the left with a maximum steady-state signal on stator windings.

FIGS. 1 and 2 illustrate a first embodiment of the present invention in a longitudinal cross-sectional view of the electromagnetic motor. Looking first at FIG. 1, the stator of the electromagnetic motor includes a tube 2 of a non-ferrous (non-magnetic) material (e.g., aluminum, plastic, etc.) that has a selected length and inner diameter. The ends of tube 2 are shown open, however a non-ferrous cap can be placed on each end to prevent foreign material from entering tube 2 which could imped the free movement of the piston. Additionally, a hollow core magnet 3 (i.e., a doughnut magnet) is substantially centered longitudinally on the outside of tube 2 with the diameter of the center hole in magnet 3 being substantially the same as the outer diameter of tube 2. Further, wound around the outside of tube 2, on opposite sides of magnet 3, are two electrically conductive coils 4a and 4b (i.e., inductors or voice coils) each next to, or equally spaced apart from (FIG. 5), the sides of magnet 3. Also shown is a optional flange 6 offset from the center of tube 2 extending perpendicularly outward from the outer surface of tube 2. Flange 6 is not a necessary part of the present invention that can optionally be included for assembly convenience to substantially longitudinally center magnet 3 and coils 4a and 4b on tube 2. Thus the distance of flange 6 from the longitudinal center of tube 2 is the width of coil 4b and one half the width of magnet 3, plus the width of any spacing, if any, between coil 4b and magnet 3 as in FIG. 5. In assembling the stator using flange 6, coil 4b is placed in contact with the side of flange 6 toward the longitudinal center of tube 2 with coil 4b being wound in place on tube 2, or if pre-wound, slipped over the distal end of tube 2 and moved into place in contact with flange 6. Next magnet 3 is slipped onto tube 2 and advanced to be in contact with coil 4b, or spaced apart a selected distance therefrom if desired. Then coil 4a is either wound or placed on tube 2 on the opposite side of magnet 3 either in contact with or the same selected distance as coil 4b from, magnet 3. While not shown in FIG. 1, in actual use there may be a non-ferrous, non-electrically conductive cover (e.g., shrink tubing) that encircles magnet 3 and coils 4a and 4b.

The piston of the electromagnetic motor of the first embodiment is internal to tube 2, namely a solid core, circular magnet 5 that has a diameter that is slightly smaller than the inner diameter of tube 2 to insure that magnet 5 (i.e., the piston) moves freely within tube 2 without coming into contact with the inner surface of tube 2. Since stator magnet 3 is a permanent magnet, magnetic interaction is always present between the stator and magnet 5 regardless of the position of magnet 5 within tube 2 whether or not coils 4a and 4b have a signal applied to them. When coils 4a and 4b are unenergized the magnetic interaction between circular hollow core magnet 3 and cylindrical, solid core magnet 5 not only centers magnet 5 with respect to magnet 3, it also causes magnet 5 to float within tube 2 preventing magnet 5 from coming into contact with the interior surface of tube 2 given that the polarity of magnets 3 and 5 are reversed from each other as shown in FIG. 1. When coils 4a and 4b are energized, magnet 5 continues to float within tube 2 with the electromagnetic fields created by coils 4a and 4b repositioning magnet 5 within tube 2.

In FIG. 1 stator magnet 3 is shown with the S pole to the left and the N pole to the right, while piston magnet 5 has the N pole to the left and the S pole to the right thus centering the piston in the home position relative to stator magnet 3 by magnetic attraction of the fields between the two magnets when coils 4a and 4b are unenergized (i.e., no signal is applied to coils 4a and 4b).

Note that in FIGS. 1 and 2, and in each of the other figures, coils 4a and 4b are wound in opposite directions which is illustrated by the inclusion on the cut end of each wire in coils 4a and 4b having either a ● or an x. With each of coils 4a and 4b being of substantially equal size (ie., same number of turns and same wire diameter) a signal of the same magnitude being applied to each of the coils, an electromagnetic field is created by the coils which magnetically moves the piston (i.e., magnet 5) either to the right or left within tube 2 with the field created by coils 4a and 4b being in opposite directions in tube 2.

In FIG. 2, piston magnet 5 is shown at the left most position when a maximum steady-state signal is applied to coils 4a and 4b. Of course the signal on coils 4a and 4b is more typically continuously varying in magnitude, the momentum of magnet 5 in either direction will overshoot or undershoot the position that would be maintained if a fixed magnitude signal were to be applied to coils 4a and 4b.

The magnetic strength of stator magnet 3 and piston magnet 5, as well as the size of coils 4a and 4b and maximum strength of the signal to be applied to them, are all a matter of design choice. This is influenced by many factors, not the least of which is the physical weight of the piston, inner diameter of tube 2, length of travel of the piston and the range of vibration strengths desired. The cross-section width of stator magnet 3 to the width of piston magnet 5 also has an influence on the operation of the vibrator. For example, in this embodiment the closer the width of piston magnet 5 is to stator magnet 3, the more heat that is generated during operation, while at the same time the wider piston magnet 5 is relative to the combined width of the stator magnet 3 and coils 4a and 4b the longer the total possible travel distance of the piston. Additionally, the thicker the walls of tube 2, the more heat that is generated.

Figure 3:
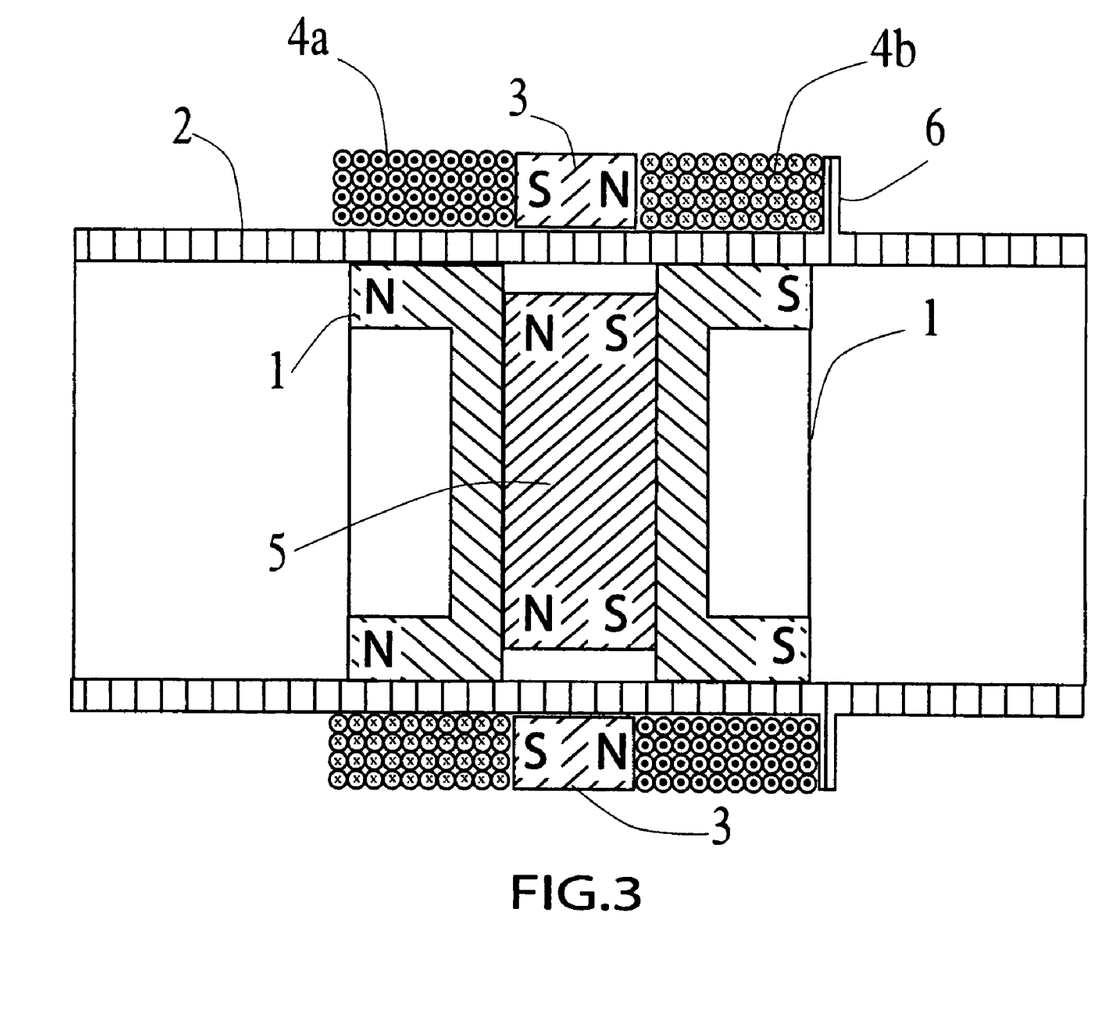
FIG. 3 is a longitudinal cross-section of a second embodiment of the present invention with the piston centered at the at rest position with stator windings unpowered.
Figure 4:
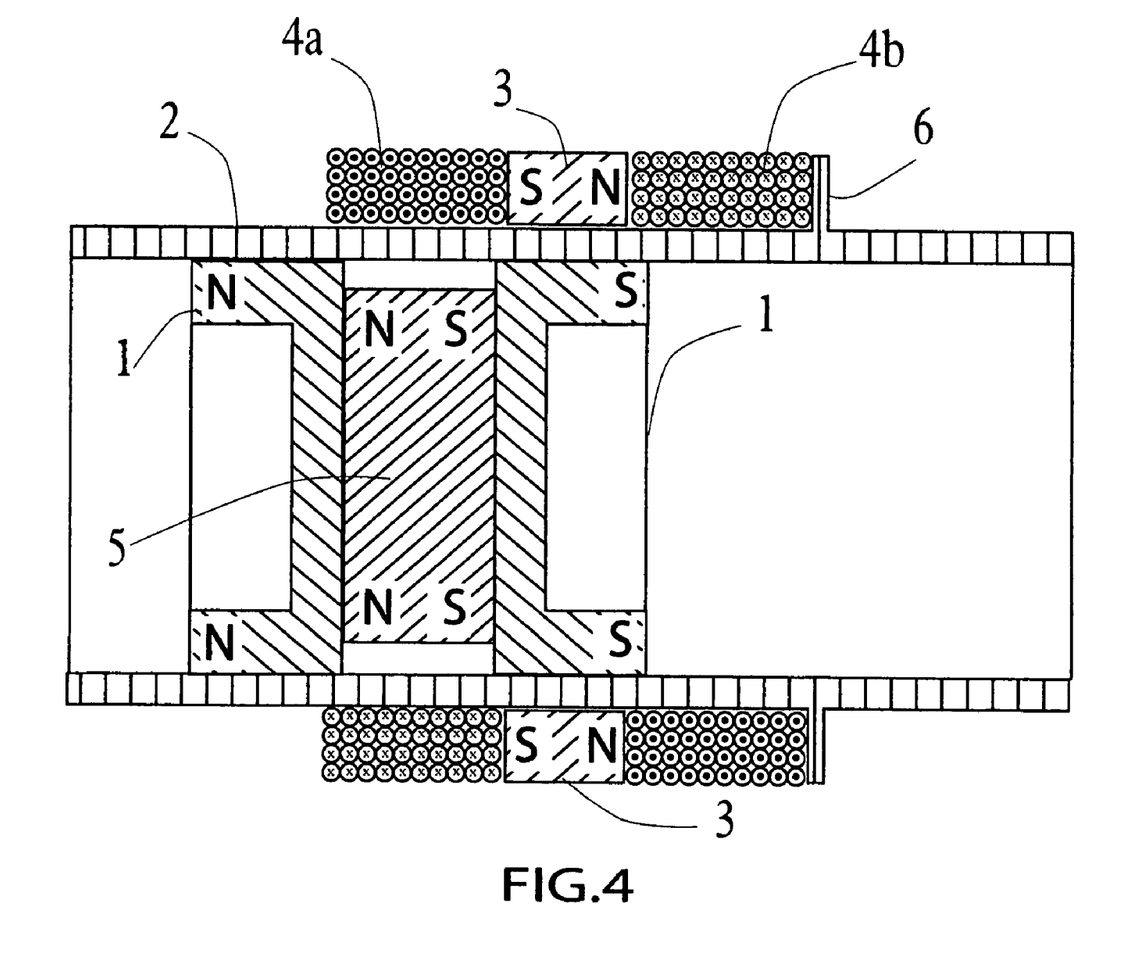
FIG. 4 is a longitudinal cross-section of the second embodiment of FIG. 3 with the piston at the furthest travel point to the left with a maximum steady-state signal on stator windings.

FIGS. 3 and 4 illustrate a second embodiment of the present invention that is similar to the first embodiment of FIGS. 1 and 2. In the second embodiment the piston is modified from that of the first embodiment, namely piston magnet 5 is thinner than as in FIGS. 1 and 2. The piston also includes a pair of magnetically conductive plates 1 (e.g., a ferrous material such as steel) magnetically affixed to either side of magnet 5 to extend the magnetic field width of magnet 5. The inclusion of plates 1 in this embodiment increases the magnetic density from that of the first embodiment and better focuses the magnetic energy between the piston and the stator. Here the width of magnet 5 and plates 1 is shown to be wider than the width of magnet 5 in the first embodiment. The width of the piston in this embodiment is also a matter of design choice using substantially the same criteria as stated above for the selection of the width of magnet 5.

In FIGS. 3 and 4, plates 1 are shown as having an outer diameter that is slightly smaller than the internal diameter of tube 2, with the diameter of magnet 5 being smaller than the internal diameter of tube 2 which is a matter of design choice. Since plates 1 are of a ferrous material, they are held by magnetic attraction or, if necessary, glued on opposite faces of magnet 5. Plates 1 and magnet 5, each having a diameter that is smaller than the internal diameter of tube 2, insures that that combination of components move freely as a unit within tube 2 without coming into contact with the inner surface of tube 2. Plates 1 extend the magnetic effect of magnet 5. Plates 1 are shown having a "C" shaped cross-section, however they could have a rectangular cross-section. To minimize the weigh of plates 1 they could have a "C" or "cup" shape as shown in FIGS. 3 and 4.

In FIG. 4, the piston (i.e., plates 1 and magnet 5) is shown to the left similar to the piston position in FIG. 2 if a steady state, maximum signal is applied to coils 4a and 4b. Note that in this embodiment, under maximum steady state conditions that drive the piston to the left, magnet 5 remains below, or within the center opening of coil 4a. However, under normal signal varying conditions the piston by virtue of momentum will move some what beyond the position that would be sought if a steady state signal was applied to coils 4a and 4b.

It can also be seen in FIG. 3 that coils 4a and 4b are positioned to be opposite a corresponding plate 1 of the piston when no power is applied to coils 4a and 4b; that is the spacing between coils 4a and 4b is substantially equal to the width of piston magnet 5. Also to optimize the magnetic coupling between each of plates 1 and the corresponding one of coils 4a and 4b, each of plates 1 can be formed to have a "squared C" cross-sectional shape as shown in FIG. 3 (i.e., cup shaped with a hollow center area of a selected depth and diameter) thus concentrating the magnetic field of piston magnet 5 around the interior surface of tube 2 and closer to coils 4a and 4b.

Experimental results point to the best design for the second embodiment being: the inclusion of a thin walled tube 2 to yield cooler operation and a stronger magnetic flux coupling between the stator and the piston; magnets 3 and 5 being substantially equal in width; each of plates 1 having substantially the same width as magnet 5 (i.e., a piston width that is three times the width of magnet 5); coils 4a and 4b being equal to each other in width and inductive value; each of coils 4a and 4b having a width that is approximately 20% greater than the width of a single plate 1; and the strength of the signals applied to coils 4a and 4b being such to cause each of the coils to generate a magnetic field of equal strength, thus if coils 4a and 4b are as described above (i.e., of equal width and equal inductive value then the signals would be substantially the same thus permitting coils 4a and 4b to be wired in series, while maintaining the reverse winding as shown, and a single signal being applied to the serially connected coils).

Figure 5:
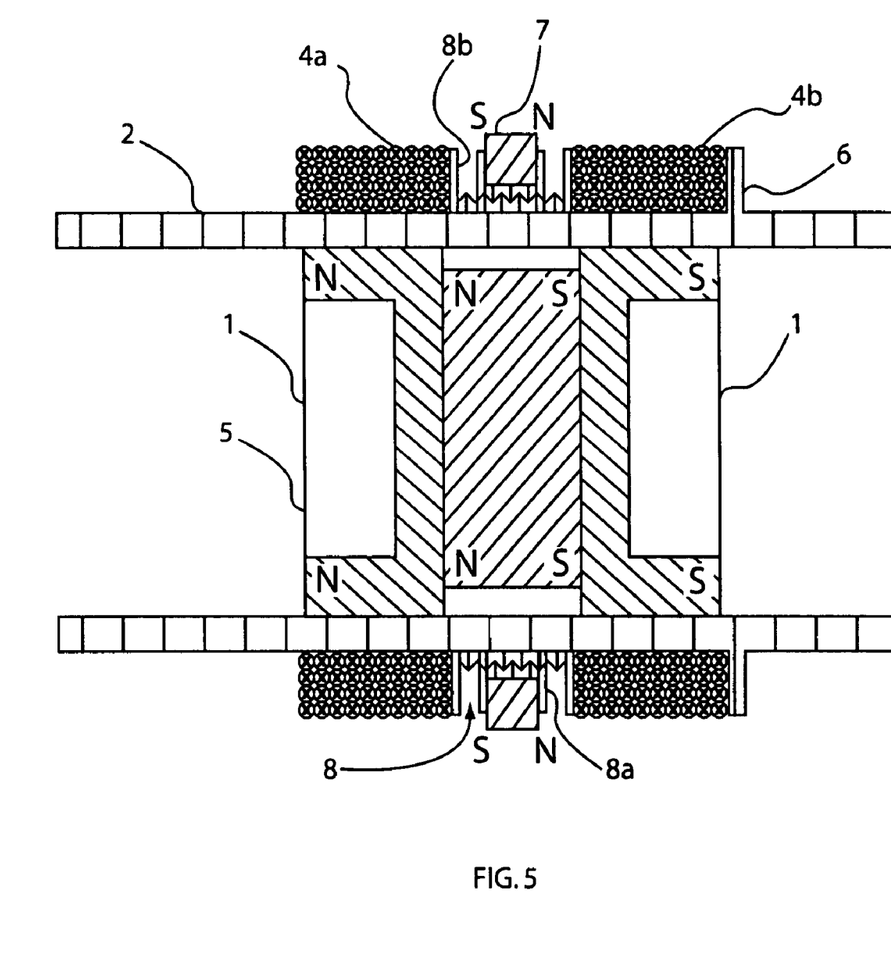
FIG. 5 is a longitudinal cross-section of a modified second embodiment of FIG. 3 with the piston at the at rest position with stator windings unpowered.

FIG. 5 is a longitudinal cross-section of a modified second embodiment of FIG. 3. The difference being that stator magnet 3 of FIG. 3 has been replaced with an adjustable centering stator magnet assembly. The stator magnet assembly of FIG. 5 includes a hollow core magnet 7 and an adjustable assembly 8. Assembly 8 includes two pieces, a "U" shaped carriage 8a with screw threads facing inward in a wider "U" shaped ring 8b with screw threads facing outward and in communication with the threads of carriage 8a. Magnet 7 is mounted in the "U" shaped portion of carriage 8a, with the magnet 7-assembly 8 mounted outside tube 2 in place of magnet 3 between coils 4a and 4b as in FIG. 3. By rotating carriage 8a in ring 8b the position of magnet 7, relative to coils 4a and 4b can be adjusted. If one of coils 4a and 4b create a stronger magnetic field than the other when the same signal is applied to both coils, or if the vibration motor is mounted vertically, being able to adjust the "centered" position of magnet 7 could overcome the effect of either the stronger magnetic field of one coil or the pull of gravity to cause the piston not to be able to travel the same distance in both directions.

For best performance, experiments suggest that the width of assembly 8 (i.e. the width of magnet 7 plus the sum of the width of the spaces on either side of magnet 7) is substantially the same as the width of one of coils 4a and 4b, with the width of coils 4a and 4b being equal to each other.

Figure 6:
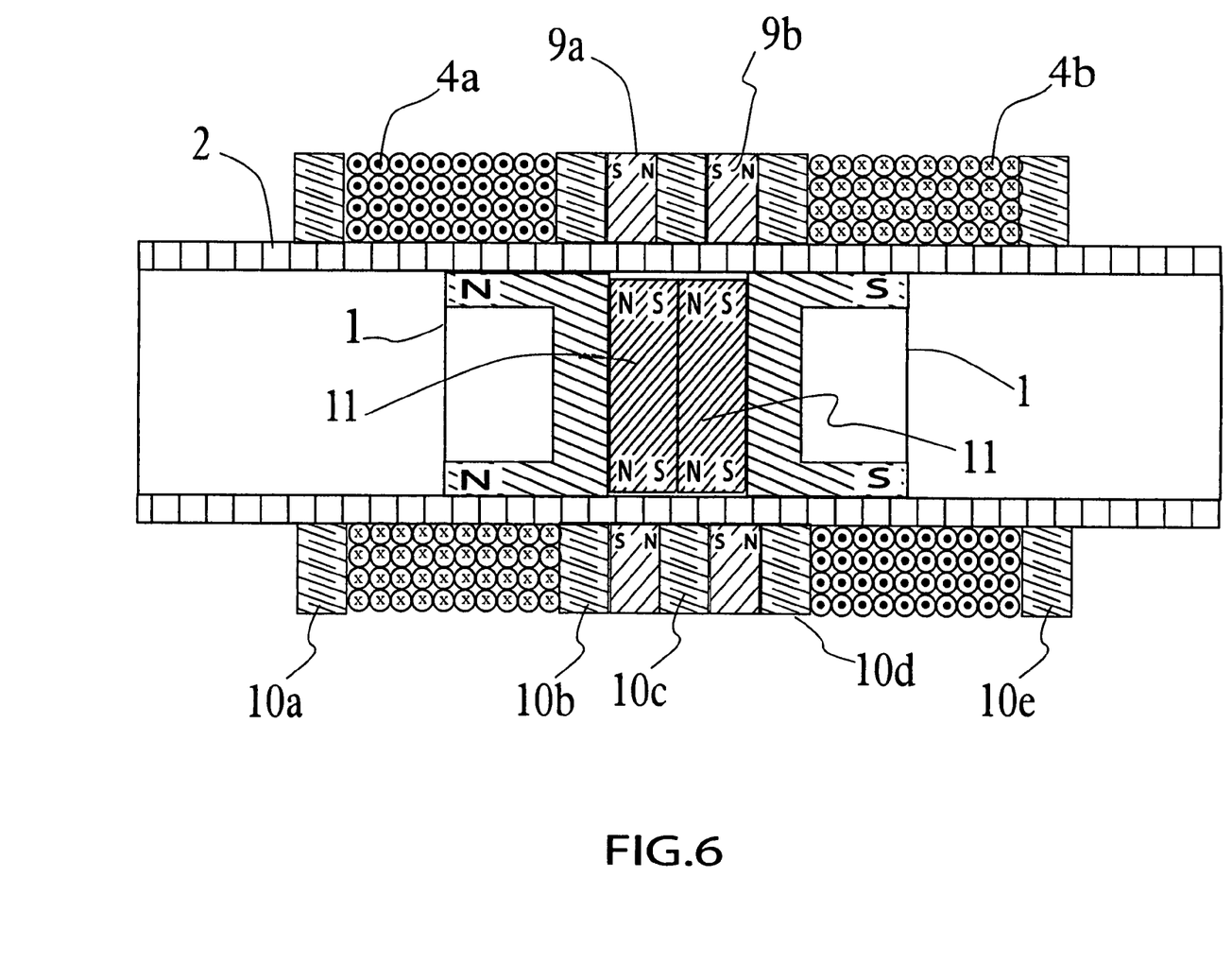
FIG. 6 is a longitudinal cross-section of a third embodiment of the present invention with the piston centered at the at rest position with stator windings unpowered.
Figure 7:
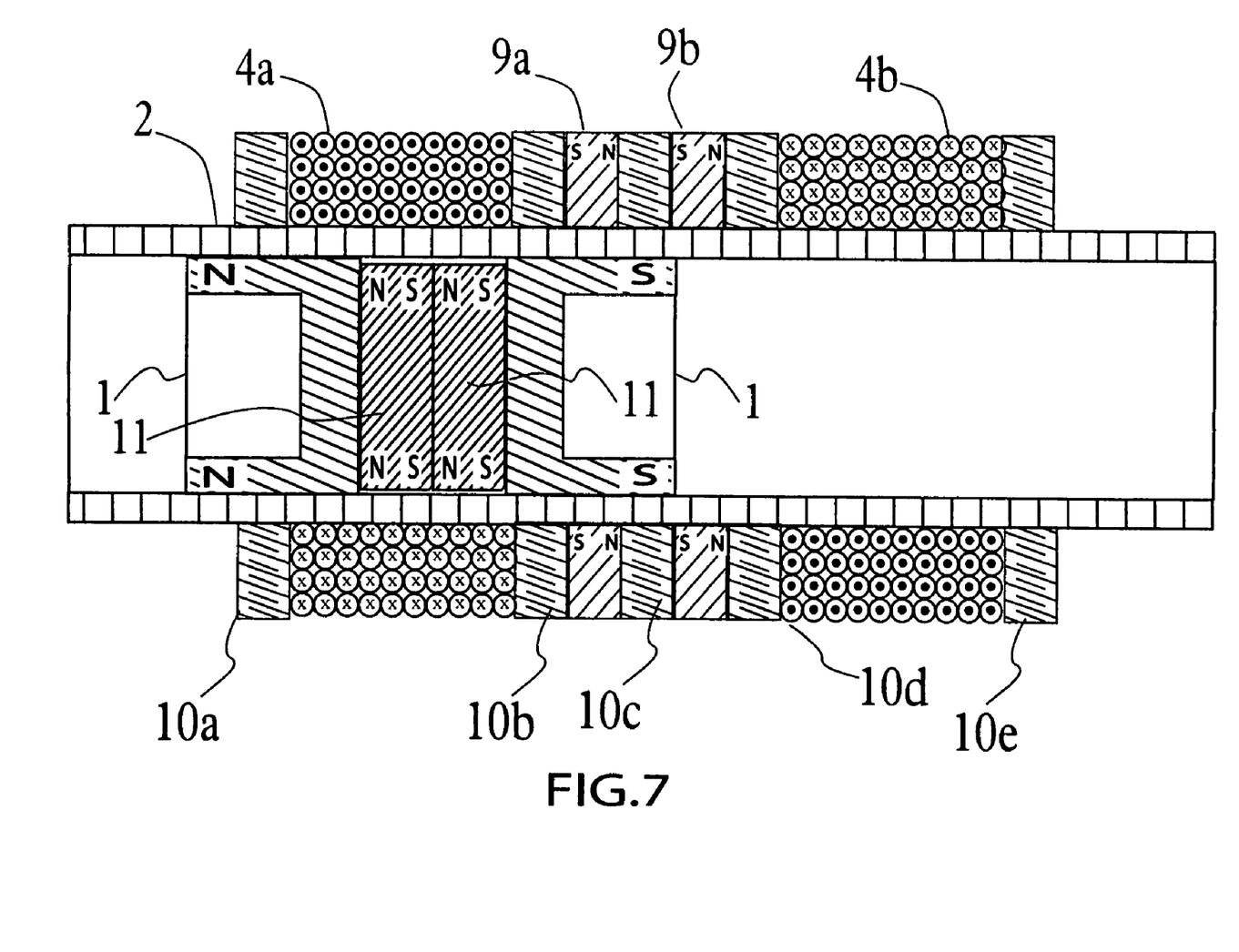
FIG. 7 is a horizontal cross-section of the third embodiment of FIG. 6 with the piston at the furthest travel point to the left with a maximum steady-state signal on stator windings.

A third embodiment of the present invention is illustrated in FIGS. 6 and 7 in a longitudinal cross-section similar to the illustrations of the other embodiments. The piston in this embodiment resembles that of the second embodiment of FIGS. 3 and 4. The piston in this embodiment has a pair of magnets 11 as opposed to the single magnet 5 shown in FIGS. 3 and 4, however this embodiment would work substantially as well if the piston had only a single magnet. The piston in this embodiment has plates 1 that are similar to those of the second embodiment.

In this embodiment the stator is significantly different than in previous embodiments. On the exterior of tube 2, in the center, there is mounted a non-ferromagnetic ring (e.g., aluminum) 10c. On either side of ring 10c there is a hollow core magnet 9a and 9b, respectively, in contact with ring 10c with the combined width of magnets 9a and 9b and ring 10c being shown as substantially the same as the combined width of the pair of magnets 11. On the opposite side of, and in contact with, each of magnets 9a and 9b there is a second and third non-ferromagnetic ring 10b and 10d, respectively. Next in turn in contact with the free side of rings 10b and 10d are voice coils 4a and 4b, respectively, and on the other side of, and in contact with, coils 4a and 4b there are non-ferromagnetic rings 10a and 10e. With this stator configuration, the combined width of magnets 11 and end plates 1 of the piston is shown to be the sum of one-half the width of each of coils 4a and 4b, the width of rings 10b, 10c, and 10d, and the width of each of magnets 9a and 9b. As discussed above, and also true for this embodiment, the widths of the stator and piston parts, and their relationship to each other is a matter of design choice.

This configuration affords easier assembly and centering of the stator components. Rings 10a-e can include set screws (not shown) that extend radially inward allowing for retention of each of the rings individually by screwing the set screws inward to make tight contact with the exterior surface of tube 2. Thus, should it be necessary to shift the stator components, the set-screws can be loosened allowing for repositioning of the stator components after which the set-screws are again tightened.

As in previous embodiments as illustrated in the respective figures, FIG. 7 is a horizontal cross-section of the third embodiment with the piston at the furthest travel point to the left with a maximum steady-state signal on stator windings 4a and 4b.

With the stator components in a configuration as shown in FIGS. 6 and 7, experimental results indicate that the best performance is achieved when the sum of the widths of spacers 10b, 10c and 10d, and the widths of magnets 9a and 9b is substantially equal to the width of one of coils 4a and 4b where the widths of coils 4a and 4b are substantially the same as each other.

Figure 8:
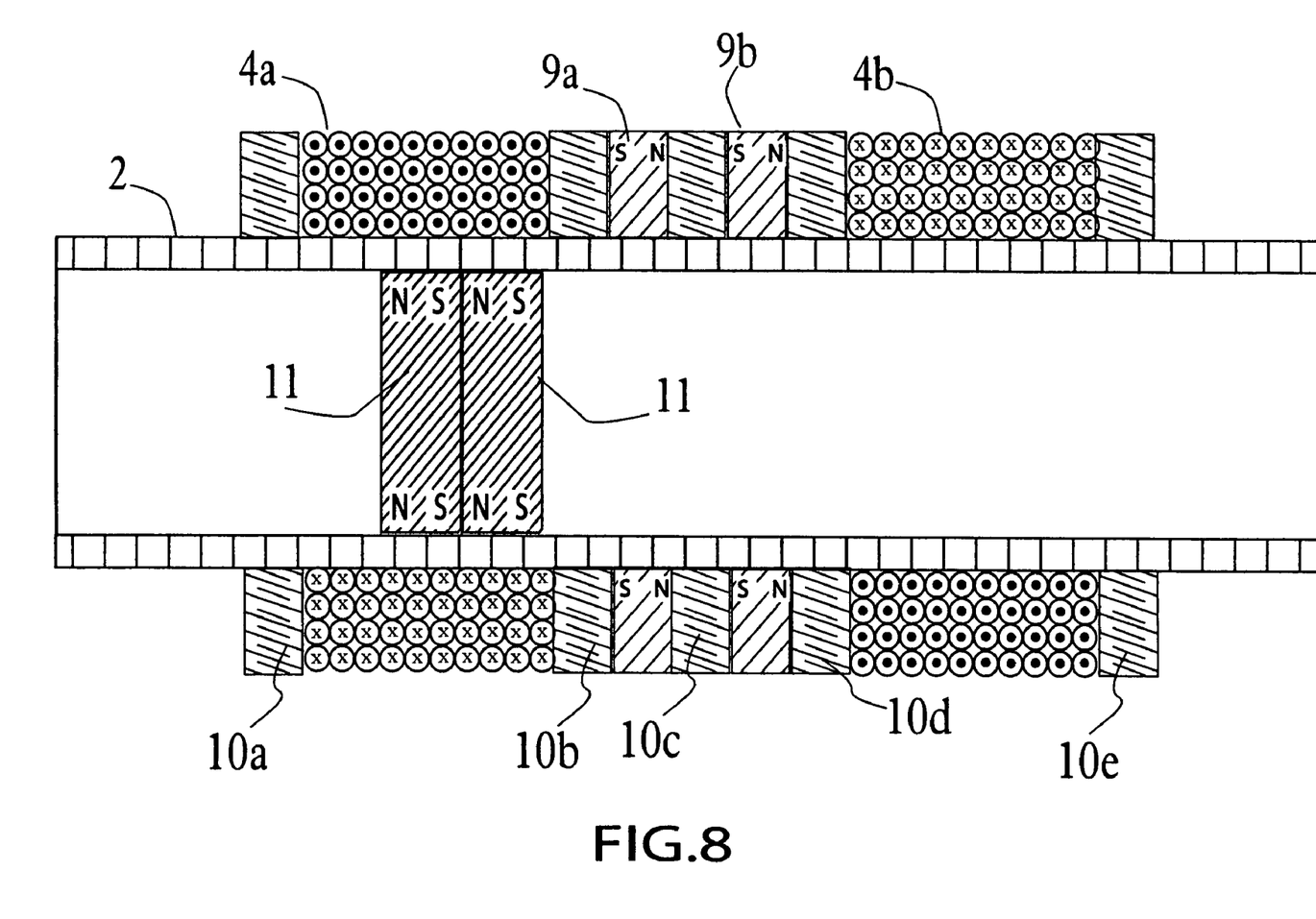
FIG. 8 is a horizontal cross-section of a modified third embodiment of FIG. 6 with the piston at the furthest travel point to the left with a maximum steady-state signal on stator windings.

FIG. 8 is a horizontal cross-section of a modified third embodiment with the piston at the furthest travel point to the left with a maximum steady-state signal on stator windings with the piston only having magnets 11 without plates 1 that are shown in FIGS. 6 and 7.

Figure 9A:
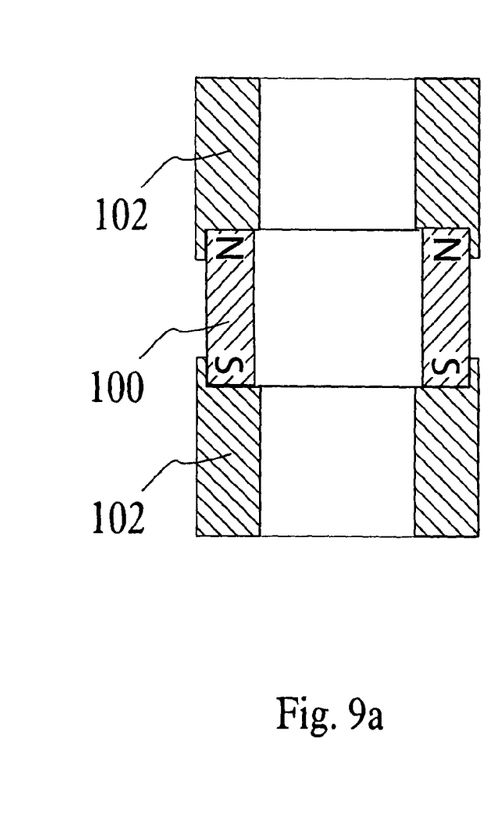
FIGS. 9a, 9b, 9c and 9d are views of fourth embodiment of the present invention that is designed to be mounted vertically.
Figures 9B, 9C:
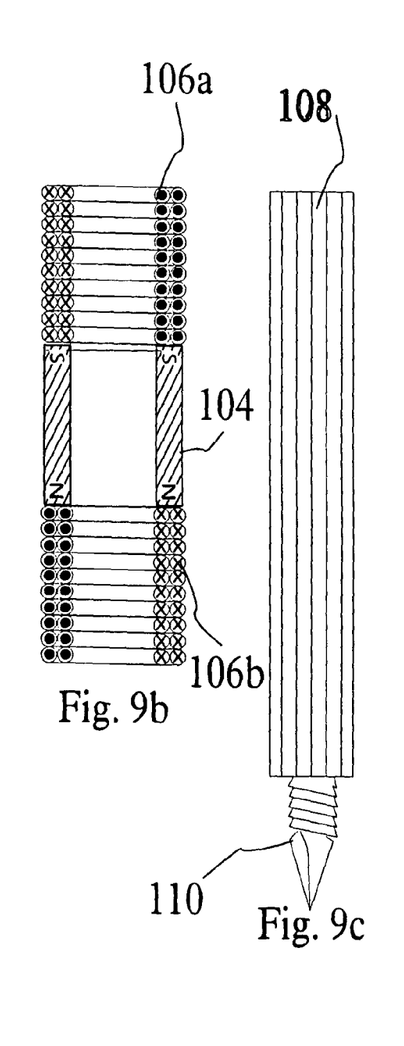

FIGS. 9a-c are views of an exploded vertically self-mounting fourth embodiment of the present invention which, when fully assembled, has the piston as the outermost component of the electromagnetic motor of this embodiment of the present invention. FIGS. 9a and 9b are vertical cross-sections of the piston and stator, respectively, and FIG. 9c is a vertical plan view of the non-ferrous center self-mounting post 108 shown here with a mounting screw 110 integral with the bottom end of post 108.

FIG. 9a illustrates the three component piston having a hollow core magnet 100 with a pair of magnetically conductive rings 102 on either end of magnet 100. In this view it can be seen that the inner diameter of magnet 100 is slightly larger than the inner diameter of rings 102. As will be seen below, the inner diameter of rings 102 is slightly larger than the outer diameter of the stator. Additionally, each of magnetically conductive rings 102 have a cut-out to receive a side of magnet 100 to insure that rings 102 and magnet are centered, one with respect to the other.

FIG. 9b illustrates the three component stator having a hollow core magnet 104 and on opposite ends of magnet 104 there are coils 106a and 106b that are wound in opposite directions to each other as can be seen by the ● and x on the cut ends of the coil wires. For the stator the internal diameter of magnet 104 and coils 106a and 106b is slightly larger than the outer diameter of mounting post 108. Further, the largest outer diameter of magnet 104 or coils 106a and 106b must be smaller than the inner diameter of conductive rings 102 of the piston. The best design is one where the outer diameter of magnet 104 and each of coils 106a and 106b are substantially the same.

Figure 9D:
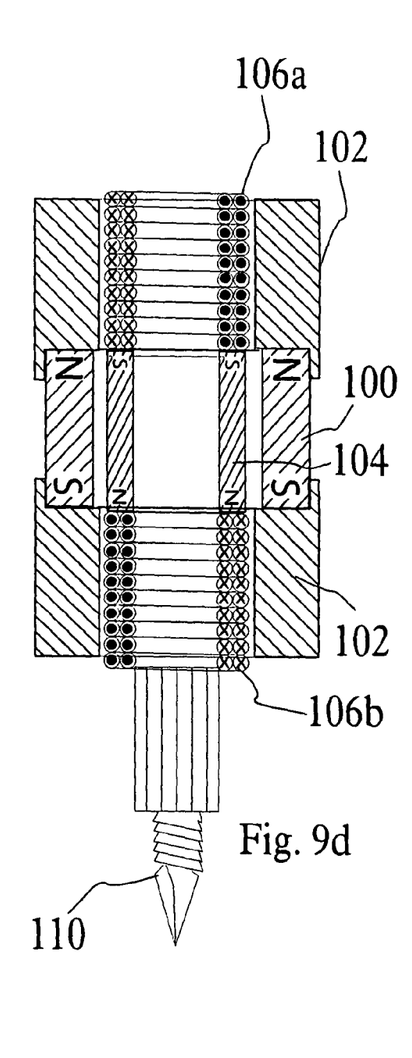

Turning now to FIG. 9d a cross-section of the assembled vibrator of the fourth embodiment is shown. Here, the stator components, magnet 104 and coils 106a and 106b are non-movably affixed to mounting post 108 with the piston components surrounding and spaced apart from the outer surfaces of the stator components. As discussed above for the other embodiments, with the polarity of piston magnet 100 being opposite to that of the stator magnet 104, the piston floats around the stator and is centered as shown when no signal is applied to stator coils 106a and 106b and otherwise operates the same as the other embodiments. Note that in FIG. 9d the stator is not mounted at the bottom of self-mounting post 108 to allow downward travel of the piston, when driven in that direction, so that the bottom ring 102 of the piston does not hit the mounting surface. Conversely, the location in which the magnetic motor of this embodiment is to be used must be selected to leave sufficient space between the top limit of that space and the top of self-mounting post 108 to allow the piston to travel upward when driven in that direction without the top ring 102 hitting the surface above the magnetic motor of this embodiment.

Figure 10:
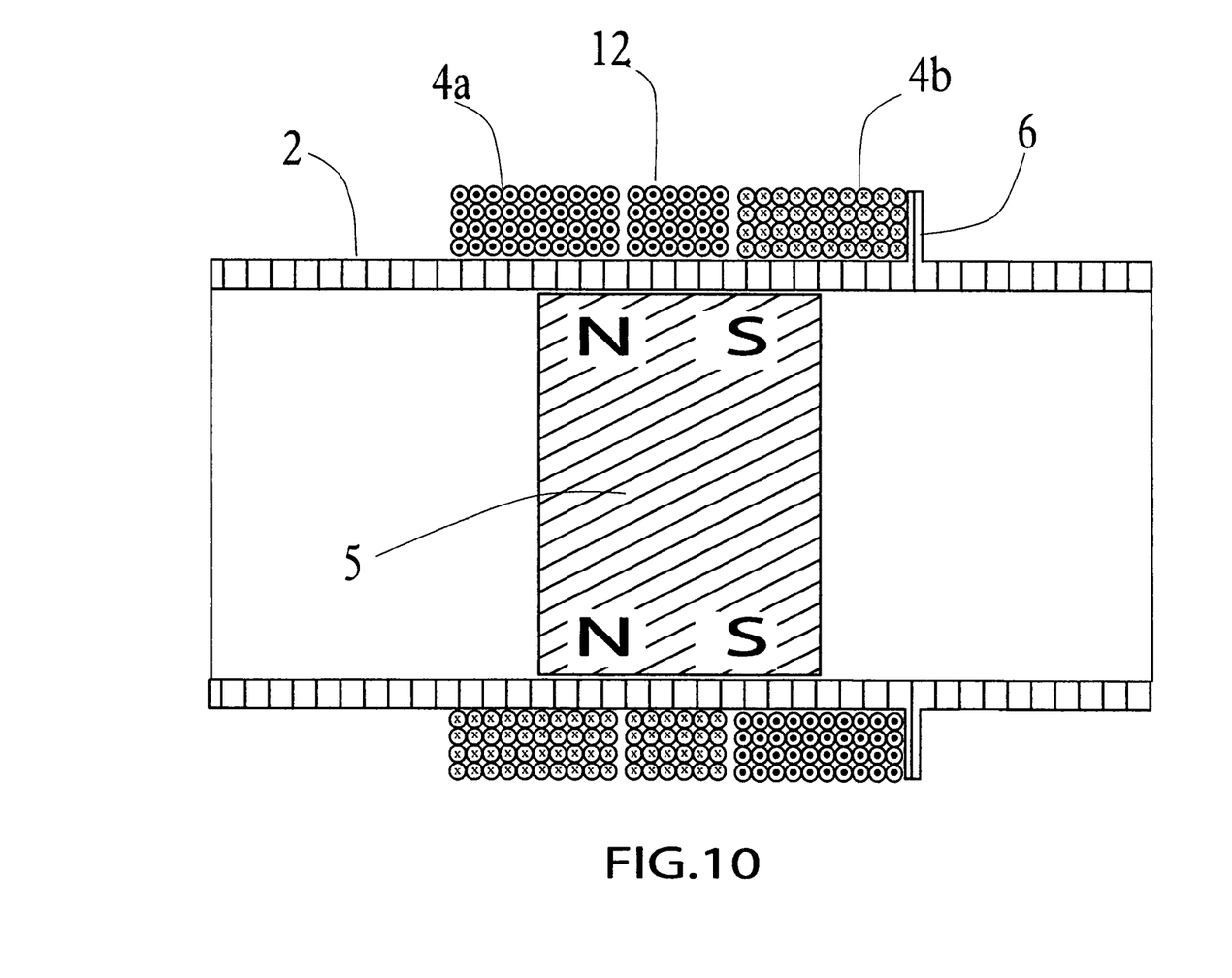
FIG. 10 is a longitudinal cross-section of a modified first embodiment of the present invention of FIG. 1 with the piston centered at the at rest position with the stator magnet replaced by a coil powered by a fixed signal and the outer two stator windings unpowered.

Next, FIG. 10 is that of a longitudinal cross-section of a modified first embodiment of the present invention of FIG. 1 with the piston centered in the at rest position with stator magnet 3 replaced with centering force coil 12. In operation, centering force coil 12 must be constantly powered to create a fixed magnitude field equivalent to that of magnet 3 so this configuration operates as described above with respect to FIGS. 1 and 2 of the first embodiment.

Figure 11:
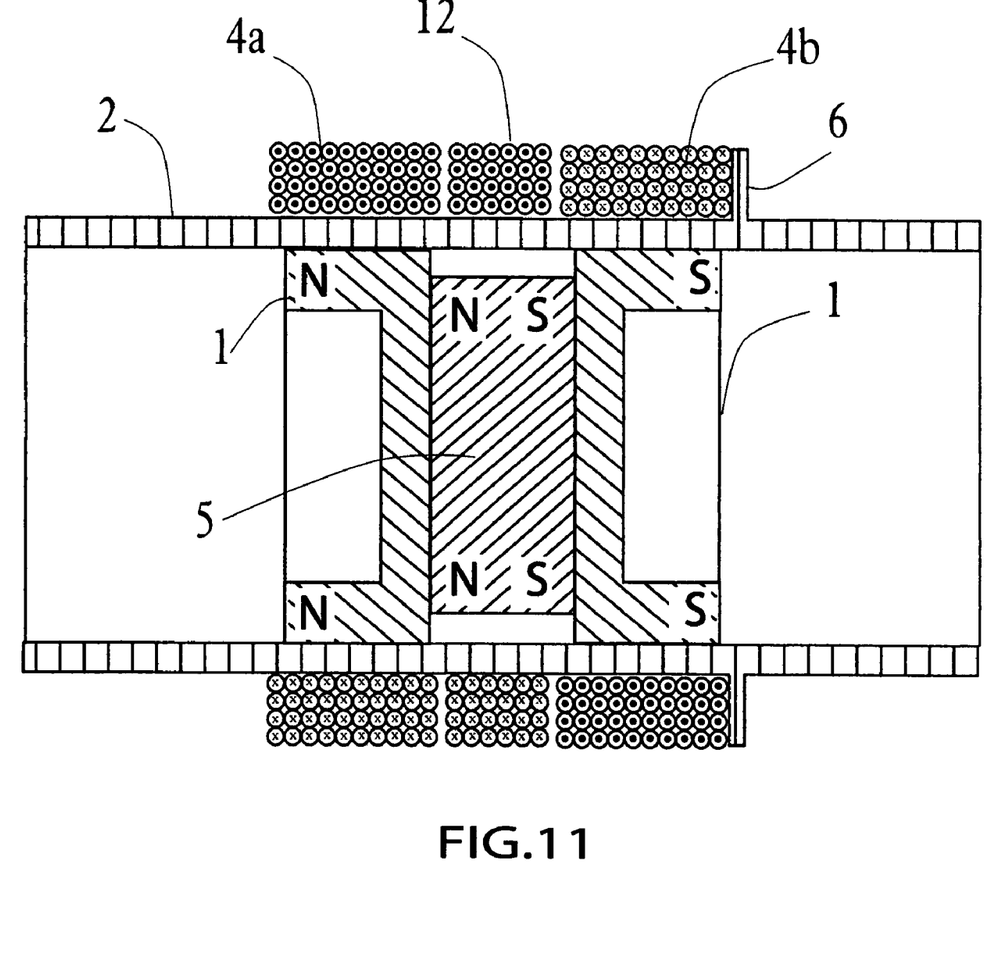
FIG. 11 is a longitudinal cross-section of a modified second embodiment of the present invention of FIG. 3 with the piston centered at the at rest position with the stator magnet replaced by a coil powered by a fixed signal and the outer two stator windings unpowered.

Similarly, FIG. 11 illustrates a longitudinal cross-section of a modified second embodiment of the present invention of FIG. 3 with the piston centered at the at rest position with the stator magnet 3 replaced by a centering force coil 12 as described above in the discussion of FIG. 10. Here to, in operation centering force coil 12 must be constantly powered so this configuration operates as described above with respect to FIGS. 3 and 4 of the second embodiment.

There are also other combinations of devices capable of creating a magnetic motor of the present invention that could be utilized and, after seeing the features of the present invention, one skilled in the art could create equivalent configurations that include the features of the present invention. Therefore it is intended that the present invention only be limited by the claims, and equivalents upon which the claims can be read.

What is claimed is:

1. An electromagnetic motor comprising:
a stator having:
a non-ferrous post of a selected length having a first end and a second end and a first diameter;
first and second stator magnetic flux producing elements spaced apart from each other around said post; and
an intermediate stator magnetic flux producing element around said post between said first and second stator flux producing elements;
with each of said first and second stator magnetic flux producing elements and said intermediate stator magnetic flux producing element each having an internal diameter that is slightly larger than said first diameter and said stator having a third diameter being a maximum external diameter of the stator components;
a piston encircling said stator having:
a piston magnetic flux producing element ring having a first and second end with an internal diameter at least slightly greater than said third diameter and an external diameter being a fourth diameter; and
first and second ferro-magnetic rings one of which is coupled to each of said first and second ends of said piston magnetic flux producing element ring with each of said first and second ferro-magnetic rings having an internal diameter at least slightly greater than said third diameter and an external diameter being at least as large as said fourth diameter;
wherein said intermediate stator flux producing element has a first magnetic polarity and said piston magnetic flux producing element has a second magnetic polarity with said first and second magnetic polarities being in opposite axial directions relative to said post; and
wherein a home position of said piston is substantially centered relative to said intermediate stator flux producing element when no magnetic flux is being supplied by said first and second stator magnetic flux producing elements.

2. An electromagnetic motor as in claim 1 wherein:
said intermediate stator magnetic flux producing element and said piston magnetic flux producing element ring are each a hollow core circular magnet;
each said first and second stator magnetic flux producing elements are coils wound in opposite directions around said post each having approximately the same inductance value.

3. An electromagnetic motor as in claim 1 wherein said non-ferrous post has attached to said first end a mounting device for affixing said post to a selected surface.

4. An electromagnetic motor as in claim 1 wherein said piston magnetic flux producing element ring has a width substantially equal to, or wider than, said intermediate stator magnetic flux producing element.

5. An electromagnetic motor comprising:
a stator having:
a non-ferrous tube of a selected axial length having a first end and a second end, a selected internal cross-sectional shape along the axial length and a selected wall thickness;
first and second stator electrically conductive coils wound in the opposite direction from each other with each disposed to produce a selected magnitude and polarity of magnetic flux axially within said tube in response to a signal applied to both coils with each of said first and second stator coils spaced apart from each other and mounted externally around said tube; and
at least one intermediate stator magnetic flux producing element, or elements, disposed to produce a constant magnitude and first polarity of magnetic flux axially in a first direction within said tube and mounted externally around the tube between said first and second stator electrically conductive coils; and
a piston within said tube sized and shaped to move freely therewithin and having an axial length that is only a fraction of the length of said tube having a piston magnetic flux producing element disposed to produce a constant magnitude and second polarity of magnetic flux axially in a second direction within said tube;
wherein during operation of said electromagnetic motor said first and second magnetic polarities are in opposite directions axially within said tube;
wherein a home position of said piston is centered relative to said intermediate stator flux producing element, or elements, when no magnetic flux is being supplied by said first and second stator electrically conductive coils;
wherein:
said piston magnetic flux producing element includes a permanent magnet with said second magnetic polarity and has a size and shape that is smaller than said selected internal cross-sectional shape of said tube;
said at least one intermediate stator magnetic producing element, or elements, with said first magnetic polarity includes a permanent hollow core magnet having a size that fits externally around said tube; and
said home position of said piston is determined by the interaction of said opposite polarities of said stator and piston magnets and relative strength of the magnetic flux produced be each of said stator and piston magnets;

wherein said piston further includes first and second ferro-magnetic plates affixed to opposite faces of said piston magnet with a size of said face of each of said plates being at least as large as said face of said piston magnet and smaller than said internal cross-sectional shape of said tube;

wherein said first and second ferro-magnetic plates each have a fourth width that is at least equal to said second width; and wherein each of said first and second plates have a "C" shaped cross-section if cut perpendicularly to said face of each of said first and second plates.

6. An electromagnetic motor as in claim 1 wherein said stator and piston magnets are of equal strength resulting in said home position of said piston magnet being substantially centered relative to said stator magnet.

7. An electromagnetic motor as in claim 5 wherein said stator hollow core magnet has a first width and said piston magnet has a second width wherein said second width is equal to, or greater than said first width.

8. An electromagnetic motor as in claim 7 wherein:

said first and second stator electrically each have conductive coils with each coil having substantially the same inductance value; and each of said coils have a same third width with said third width being at least twice said first width.

9. An electromagnetic motor as in claim 5 wherein each of said coils have a same width.

10. An electromagnetic motor as in claim 1 wherein said piston magnet and each of said first and second plates have a circular face perpendicular to a center axis of said tube with a size and shape that is smaller than said internal cross-sectional shape of said tube.

11. An electromagnetic motor as in claim 5 wherein said first and second ferro-magnetic plates each have a fourth width with the sum of twice said fourth width and said second width is the effective magnetic width of said piston with said sum being substantially greater than said first width.

12. An electromagnetic motor as in claim 5 wherein each of said first and second stator electrically conductive coils and said at least one intermediate stator magnetic flux producing element, or elements, are each a coil of wire wound externally around said tube with said first and second stator electrically conductive coils having substantially the same inductance value.

13. An electromagnetic motor as in claim 12 wherein said coil or coils of said at least one intermediate stator magnetic flux producing element, or elements, has or have a combined first width and each of said first and second stator electrically conductive coils has a third width with said third width being at least twice said first width.

14. An electromagnetic motor as in claim 12 wherein said piston magnetic flux producing element includes a permanent magnet with said second magnetic polarity.

15. An electromagnetic motor as in claim 14 wherein said piston further includes first and second ferro-magnetic plates affixed to opposite faces of said piston magnet with a size and shape of said face of each of said plates being at least as large as said face of said piston magnet and smaller than said internal size and shape of said tube.

16. An electromagnetic motor comprising:
a stator having:

a non-ferrous tube of a selected axial length having a first end and a second end, a selected internal cross-sectional shape along the axial length and a selected wall thickness;

first and second stator electrically conductive coils wound in the opposite direction from each other with each disposed to produce a selected magnitude and polarity of magnetic flux axially within said tube in response to a signal applied to both coils with each of said first and second stator coils spaced apart from each other and mounted externally around said tube; and at least one intermediate stator magnetic flux producing element, or elements, disposed to produce a constant magnitude and first polarity of magnetic flux axially in a first direction within said tube and mounted externally around the tube between said first and second stator electrically conductive coils; and a piston within said tube sized and shaped to move freely therewithin and having an axial length that is only a fraction of the length of said tube having a piston magnetic flux producing element disposed to produce a constant magnitude and second polarity of magnetic flux axially in a second direction within said tube;

wherein during operation of said electromagnetic motor said first and second magnetic polarities are in opposite directions axially within said tube;

wherein a home position of said piston is centered relative to said intermediate stator flux producing element, or elements, when no magnetic flux is being supplied by said first and second stator electrically conductive coils; and wherein said at least one intermediate stator magnetic producing element, or elements, includes:

an adjustable assembly including:
a first circular ring having an inner diameter that is slightly greater than an outer size and shape of said tube and a fifth width, said first circular ring having an outer surface with outward facing screw threads formed thereon;

a second circular ring of a sixth width with inward facing screw threads formed thereon to mate with said screw threads of said first circular ring with said sixth width being less than said fifth width; and wherein said at least one intermediate stator magnetic flux producing element includes a hollow core circular magnet mounted on an outer surface of said second ring with said magnet having a seventh width that is substantially equal to, or smaller than, said sixth width;

wherein a longitudinal position of said hollow core magnet is adjustable with respect to a longitudinal axis of said tube.

17. An electromagnetic motor comprising:
a stator having:

a non-ferrous tube of a selected axial length having a first end and a second end, a selected internal cross-sectional shape along the axial length and a selected wall thickness;

first and second stator electrically conductive coils wound in the opposite direction from each other with each disposed to produce a selected magnitude and polarity of magnetic flux axially within said tube in response to a signal applied to both coils with each of said first and second stator coils spaced apart from each other and mounted externally around said tube; and at least one intermediate stator magnetic flux producing element, or elements, disposed to produce a constant magnitude and first polarity of magnetic flux axially in a first direction within said tube and mounted externally around the tube between said first and second stator electrically conductive coils; and a piston within said tube sized and shaped to move freely therewithin and having an axial length that is only a fraction of the length of said tube having a piston magnetic flux producing element disposed to produce a constant magnitude and second polarity of magnetic flux axially in a second direction within said tube;

wherein during operation of said electromagnetic motor said first and second magnetic polarities are in opposite directions axially within said tube;

wherein a home position of said piston is centered relative to said intermediate stator flux producing element, or elements, when no magnetic flux is being supplied by said first and second stator electrically conductive coils;

wherein said at least one intermediate stator magnetic producing element, or elements, includes two permanent hollow core magnets each with said first magnetic polarity and each has a size that fits externally around said tube with each of said two permanent hollow core magnets spaced apart from each other and spaced apart from an adjacent one of said first and second stator electrically conductive coils; and said stator further includes three non-ferrous spacer rings, one spacer ring between said two permanent hollow core magnets, a second spacer ring between one of said two permanent hollow core magnets and an adjacent one of first and second stator electrically conductive coils and a third spacer ring between a second of said two permanent hollow core magnets and an adjacent a second of said first and second stator electrically conductive coils with each of said non-ferrous spacer rings being affixable to said tube at selected locations.

18. An electromagnetic motor as in claim 17 wherein said two permanent hollow core magnets and said adjacent one of said first and second stator electrically conductive coils are each spaced apart a same distance.

19. An electromagnetic motor as in claim 17 wherein said stator further includes one of a fourth and fifth non-ferrous retainer rings on a side of each of said first and second stator electrically conductive coils toward an end of said tube.

* * * * *